Feb. 1, 1955   H. G. ANDRÉ   2,701,332
DEVICE FOR CHARGING ELECTRIC STORAGE BATTERIES
Filed Feb. 18, 1953
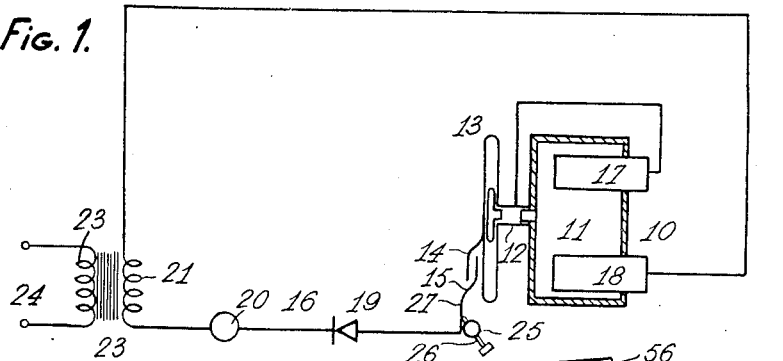
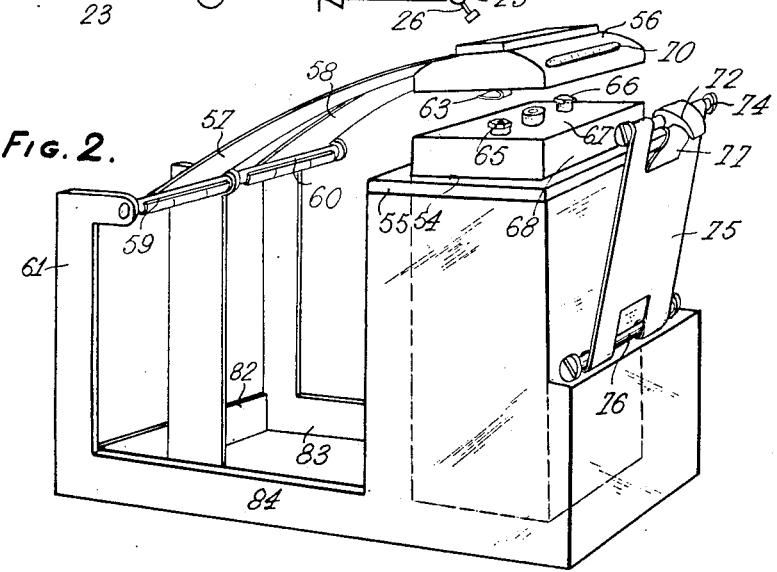
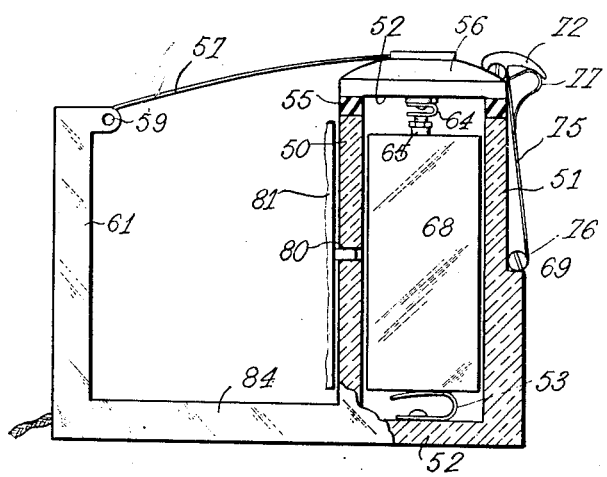
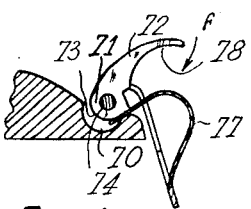
HENRI G. ANDRÉ
INVENTOR.
BY
*Karl F. Ross*
AGENT

United States Patent Office 2,701,332
Patented Feb. 1, 1955

2,701,332

DEVICE FOR CHARGING ELECTRIC STORAGE BATTERIES

Henri Georges André, Montmorency, France, assignor to Yardney International Corp., New York, N. Y., a corporation of New York Application February 18, 1953, Serial No. 337,517

2 Claims. (Cl. 320—46)

This invention relates to a device for charging electric storage batteries or accumulators.

One object of this invention is to provide means for supplying to an electric accumulator only the precise amount of electricity required for a complete charge thereof. A related object is to provide means for automatically arresting the charging operation when the said requisite amount of electricity has been supplied.

Another object is to provide means for preventing deterioration of the accumulator during a charging operation.

A further object is to provide means of the above specified kind applicable to any accumulator without modification of the latter, and consequently to provide such means that will be applicable to existing accumulators or storage batteries.

Another object is to provide means of the kind described which is easily adjustable for adaptation of accumulators of varying characteristics. Other objects involve the provision of such means which are reduced in size, easy to construct and easy and expeditious to operate.

The invention is particularly applicable to the charging of accumulators wherein the termination of the charging process is manifested by a discharge of gas or an increase in the rate of gas discharge. Accumulators of this class include the so-called silver-zinc accumulators, wherein the electro-chemical reactions proceed without any substantial discharge of gas except at the end of the process.

Means according to this invention may comprise a casing or the like adapted to have mounted therein the accumulator to be charged, and which casing is in pneumatic communication with a manometric capsule or the like comprising a contact inserted in an electric circuit controlling the charging process. On termination of the charging process the resulting discharge of gas from the accumulator increases the pressure within the manometric capsule and operates the contact to cut off the charging current.

Thus, to charge a battery, it is only necessary, with the device connected to the power source, to insert the battery into the casing. The charging operation will proceed to completion and then come to a stop. No supervision is required. The battery does not run the risk of damage by electrical overloading no matter how long it is allowed to remain in the casing of the device.

Desirably means are provided according to the invention for causing the insertion of the battery into the casing automatically to establish the charging circuit, whereby the handling operations are reduced to a minimum.

While I am aware that it has already been proposed to use the pressure generated after an accumulator has been completely charged in order to stop the charging operation, the means hitherto used for this purpose differ from those taught by my invention.

The accompanying drawing illustrates one exemplary embodiment of my invention by way of indication but not of limitation. In the drawing:

Fig. 1 is a diagrammatic showing of the invention;
Fig. 2 is a perspective view;
Fig. 3 is a sectional view; and
Fig. 4 illustrates a detail.

As shown, my invention may comprise an enclosure or casing 10 having an aperture 11 therein for the insertion of a storage battery or accumulator to be charged. The aperture is sealable by means to be described later. The enclosure 10 communicates through a connection 12 with a manometric capsule 13. The capsule carries an electric contact 14 adapted to cooperate with a contact 15 to complete an electric circuit 16 shown as constituting the charging circuit of the accumulator. The charging current is supplied through the contact plates diagrammatically indicated at 17, 18. The circuit 16 includes a rectifier 19 and preferably a signal lamp 20, and the secondary winding 21 of a transformer 22 the primary 23 of which is connected across the power network 24.

The device operates as follows:

The accumulator to be charged is inserted into the casing 10 and the latter is then sealed. The charging current is applied to the accumulator through the medium of the plates 17, 18. Throughout the normal charging period, the battery does not generate any substantial amount of gas so that the pressure within the capsule 13 remains constant and the contacts 14—15 remain closed allowing the charging current to be supplied to the accumulator. At the close of the normal charging period, that is on total completion of the reversible electro-chemical reactions, gas discharges into the enclosure 10, increasing the pressure within it, and the pressure increase is transmitted over connection 12 to the interior of capsule 13. The capsule wall is thereby distorted and moves the contact 14 away from contact 15. For a predetermined pressure prevailing within enclosure 10, the contacts 14—15 are opened and the charging current flow is cut off.

Means may be provided according to the invention for adjusting the pressure level at which the contacts will open whereby a given device may be used in conjunction with various types of batteries. The adjusting means may comprise a block 25 formed with an internally threaded bore having a screw 26 cooperating therewith, said screw extending at an angle with respect to the supporting lug 27 of the contact 15. Actuation of the screw distorts the lug to move the contact 15 towards or away from the contact 14 as may be required. Thus the initial condition of the contacts may be adjusted to adjust the pressure at which the contacts will open.

Figs. 2 to 4 relate to one practical embodiment of the invention. The enclosure is defined by the walls 50, 51 and a bottom wall 52. Secured on the bottom wall 52 is a resilient plate 53. The enclosure has an aperture 54 at its top through which the accumulator to be charged is inserted. As shown, the accumulator is box-shaped, and the enclosure is correspondingly shaped. The upper edges of the walls of the enclosure are provided with a plastic or an elasto-plastic seal 55. Cooperating with the seal 55 is a cover 56 supported from resilient arms such as the spring-arms 57, 58 pivoted at their opposite ends, at 59, 60, on the upper ends of rear standards 61. Secured on the inner surface 62 of the cover are resilient electric contacts 63, 64 interposed in the charging circuit and adapted to cooperate with terminals 65, 66 projecting from the upper face 67 of the battery tank or box 68.

Provided between cover 56 and enclosure body 69 are means for applying said cover under pressure against the seal 55 for tightly sealing the enclosure. As shown, the cover is to this end provided with a groove 70 having an arcuate cross section adapted for cooperation with a rounded end 71 of a finger 72, said end 71 being formed with an incline 73 eccentric with respect to the pivot 74 on which the finger is mounted. The pivot 74 is carried on a lug 75 rockably mounted on a pivot 76. A stamped portion 77 serves to abut the arcuate surface 78 of the finger 72 in the closed condition.

The enclosure containing casing 68 communicates through a port 80 formed in its rear wall 50 with the manometric capsule 81. The space defined between wall 50 and standards 61, cross member 82 and flanges 83, 84 serves to house a transformer, a rectifier and preferably a signal lamp and associated circuitry. The entire assembly may be inserted in a rigid transparent casing.

Voltage may be applied to the device, for example by plugging it to a power network, and all that need then be done is to insert the accumulator to be re-charged into the compartment provided therefor. The cover 56 is then applied over the aperture 54 and retained under pressure against the seal 55 by insertion of finger 72 into groove 70 in the position shown in Fig. 4, and then rocking the finger 72 in the direction indicated by the arrow *f*. This results in sealing the aperture 54 in a gas-tight manner, while at the same time the contacts 63—64 are thereby caused to cooperate with the battery terminals 65, 66 so that the charging current is applied to the battery.

When the battery is completely charged, a pressure surge occurs in the enclosure as previously explained, and the capsule 81 operates to cut off the charging circuit. On the cover 56 being lifted, after a not necessarily determinate length of time, the battery 68 jumps out under the action of spring 53 and can readily be grasped and withdrawn.

In the specification and claims, the expressions "manometric capsule" and "manometric means" should be interpreted as designating any suitable device including a wall element that is deformable or displaceable under the effect of a pressure rise such as that produced by the gas discharge in the battery.

What I claim is:

1. An arrangement for charging an electric battery, comprising a casing for containing a battery provided with a pair of terminals, a cover movably mounted on the casing, electric contacts on the casing positioned for engagement of said terminals, resilient supporting means on the bottom of the casing, pressure means on said casing for forcibly applying said cover on said casing, manometric means carried on the casing, means pneumatically connecting said manometric means with the interior of the casing, and an electric charging circuit including a movable contact supported on said manometric means.

2. An arrangement for charging an electric battery, comprising a box-like frame defining a casing at one end thereof, manometric means supported on an inner wall of said casing and communicating with the interior thereof through an aperture formed in the casing, electric charging circuit means supported on the frame in a portion thereof clear of said casing, supporting arms pivotally mounted on the frame adjacent the end thereof remote from said casing, a casing-cover supported on said arms, locking means carried on said casing for blocking the cover on the casing in a sealing condition, and electric contact means forming part of said charging circuit and including a contact carried on said manometric means.

References Cited in the file of this patent

UNITED STATES PATENTS

| | | |
|---|---|---|
| 1,034,108 | Halbleib | July 30, 1912 |
| 1,087,289 | Halbleib | Feb. 7, 1914 |
| 1,876,985 | Lippard | Sept. 13, 1932 |
| 2,104,632 | Agnew | Jan. 4, 1938 |
| 2,651,669 | Neumann | Sept. 8, 1953 |

FOREIGN PATENTS

| | | |
|---|---|---|
| 405,704 | Great Britain | Feb. 15, 1934 |